March 14, 1967 E. E. MASTERSON 3,309,080

COMPUTER SUB-SYSTEM

Filed May 27, 1965 3 Sheets-Sheet 1

INVENTOR
EARL E. MASTERSON
BY John J. McCormack
ATTORNEY

March 14, 1967 E. E. MASTERSON 3,309,080

COMPUTER SUB-SYSTEM

Filed May 27, 1965 3 Sheets-Sheet 3

United States Patent Office 3,309,080
Patented Mar. 14, 1967

3,309,080
COMPUTER SUB-SYSTEM
Earl E. Masterson, Newtonville, Mass., assignor to Honeywell Inc., a corporation of Delaware
Filed May 27, 1965, Ser. No. 459,299
14 Claims. (Cl. 271—71)

The present invention relates to unit record manipulating systems associated with data processing systems and more particularly to transport systems adapted to urge computer records along a prescribed path and to selectably redirect the records transverse to this path, on-the-fly, i.e. without arresting their original motion.

The speed and accuracy of electronic data processing is placing increasingly greater demands upon mechanical elements in a computer system. This is especially true of unit record handling sub-systems, such as apparatus for manipulating punched cards for purposes of data processing input or output. Although such unit records comprise a useful medium for storing computer data, it has become problematical to use them for communicating with computers, since electronic data processing speeds are many times faster than the fastest conceivable record-manipulation devices. For instance, the central processing unit of an electronic computer requires only about one to five milliseconds to "read" a standard 80-column punched card, while conventional card handling apparatus requires about 75 milliseconds to transport the card past the read-head.

One factor limiting card transport speeds is the problem of "turning corners" within card handling apparatus, i.e. radically changing the direction of card transport. Prior art apparatus customarily uses stop means to decelerate a card along a first direction and thereafter propels the card transversely around the corner. It will be apparent that it requires precious processing time to perform this deceleration-acceleration function; a sequence which also needlessly dissipates kinetic energy that must be re-supplied to the card.

Associated with this problem of providing stop means for card-cornering stations are the requirements for machine reliability and accuracy. It is recognized that a cornering stop, against which cards are customarily slammed at speeds of about 160 in./sec., can be expected to fray and distort the card-edges, especially over periods of extended use. Deterioration of card edges, in turn, causes misalignment and erratic feeding of the cards which leads to inaccurate card-processing and, eventually, to serious jam conditions. Computer jams can cost thousands of dollars in "down-time." Thus, the lost time and card damage caused by such stops have become less and less tolerable as electronic data processing increases the speed and accuracy of data manipulation and also increases the cost of "computer-time."

Hence, both to improve the speed of unit record "throughput" and to eliminate the card damage induced by cornering stop means, it appears to be very advantageous to make records "turn a corner" without impacting them against a stop. The present invention provides a solution to these problems through novel "stop-less" card transport system for redirecting cards "on-the-fly," without impacting them against stop means.

Card handling apparatus must often include card-eject means which are capable of stacking cards in plurals modes, that is, so that selected cards may be laterally misaligned, or offset, along an alternative center-line in the output stack. For example, "reject" or marker cards are sometimes "offset" to identify and segregate them. Relatively complex means have been employed to perform the offset function means which also increase the intramachine transport path and handling time, with a resultant loss in card throughput speed. Prior art card-ejectors have commonly employed relatively complex timing control means which are somewhat problematical to maintain in accurate adjustment. Such controls are frequently difficult to modify so as to include an offset ejection mode. Contributing to the complexity of prior art ejectors is the fact that they must commonly be provided with synchronization controls to synchronize the ejection actuators with reference operations, such as the operations of transport means, clocking means, or the like.

The present invention provides an asynchronously operative ejection system which is initiated simply by the approach of a document and independent of other machine operations. The invention is adapted to thrust a document transversely of its approach-path "on-the-fly." The novel ejection technique lends itself to simple adaptation for an offset mode; for example, simply by inhibiting one of two presence-detectors. It will be evident to those skilled in the art that a system with this capability dispenses with an abundance of control parts and associated maintenance problems, as well as allowing faster eject-actuation.

Solenoid-actuated drive means have been employed in prior art record transport systems, for instance, because they are readily operated by an electrical control pulse. Solenoid actuators can, of course, provide very quick response; for instance, to activate a card-pusher under high acceleration. Solenoid card-pushers have been employed heretofore to divert punched cards along one of several paths (e.g. to a sorting pocket) and to reposition cards for selectable ejection-alignment prior to engagement by an ejection means, such as by feed rollers. However, it is, of course, preferable to employ a single diverting element for several diversion paths, thus conserving solenoid parts and the space, maintenance, etc. required thereby. Likewise, it is preferable to employ ejector apparatus that can also provide selectable ejection-alignment. The present invention provides a novel transport arrangement and control system therefor that can satisfy such desiderata, by combining several functions into a single solenoid unit and control. Prior art ejector arrangements used in connection with document manipulation systems fall short in various ways of attaining the above desirable operating characteristics.

It is accordingly an object of the present invention to provide a record diverting arrangement associated with record manipulating apparatus which is not subject to the above, and related, disadvantages and which resolves the above-mentioned difficulties in the prior art.

It is a further object of the invention to provide such an arrangement for thrusting unit records transversely, "on-the-fly," with no need for record-stop means.

It is another object of the invention to provide a record ejector system which is controlled for both normal and "offset" ejection modes by means simply of signals from presence detector means.

Yet another object of the invention is to provide such an ejector system for ejecting records asynchronously.

Another object is to provide such an ejector means which can also stack records in selectable alignment according to simple control means.

The foregoing objects of the invention are achieved by the provision of a record diversion arrangement adjacent a corner in a transport path, the system including solenoid-actuated, resilient record-thrust means and presence detector means for controlling thrust initiation according to the passage of records along a prescribed path to be thrust transverse thereto, "on-the-fly." Electronic controls are also provided to combine the output from the detectors so as to allow selection of ejection time, or times.

The various features of novelty which characterize the invention are pointed out with particularity in the claims annexed to and forming a part of the present specification. For a better understanding of the invention, its advantages and specific objects obtained with its use, reference should be had to the accompanying drawings and descriptive matter in which there is illustrated and described preferred embodiments of the invention. In the drawings, wherein like reference numerals denote like parts:

Figures 1, 2:
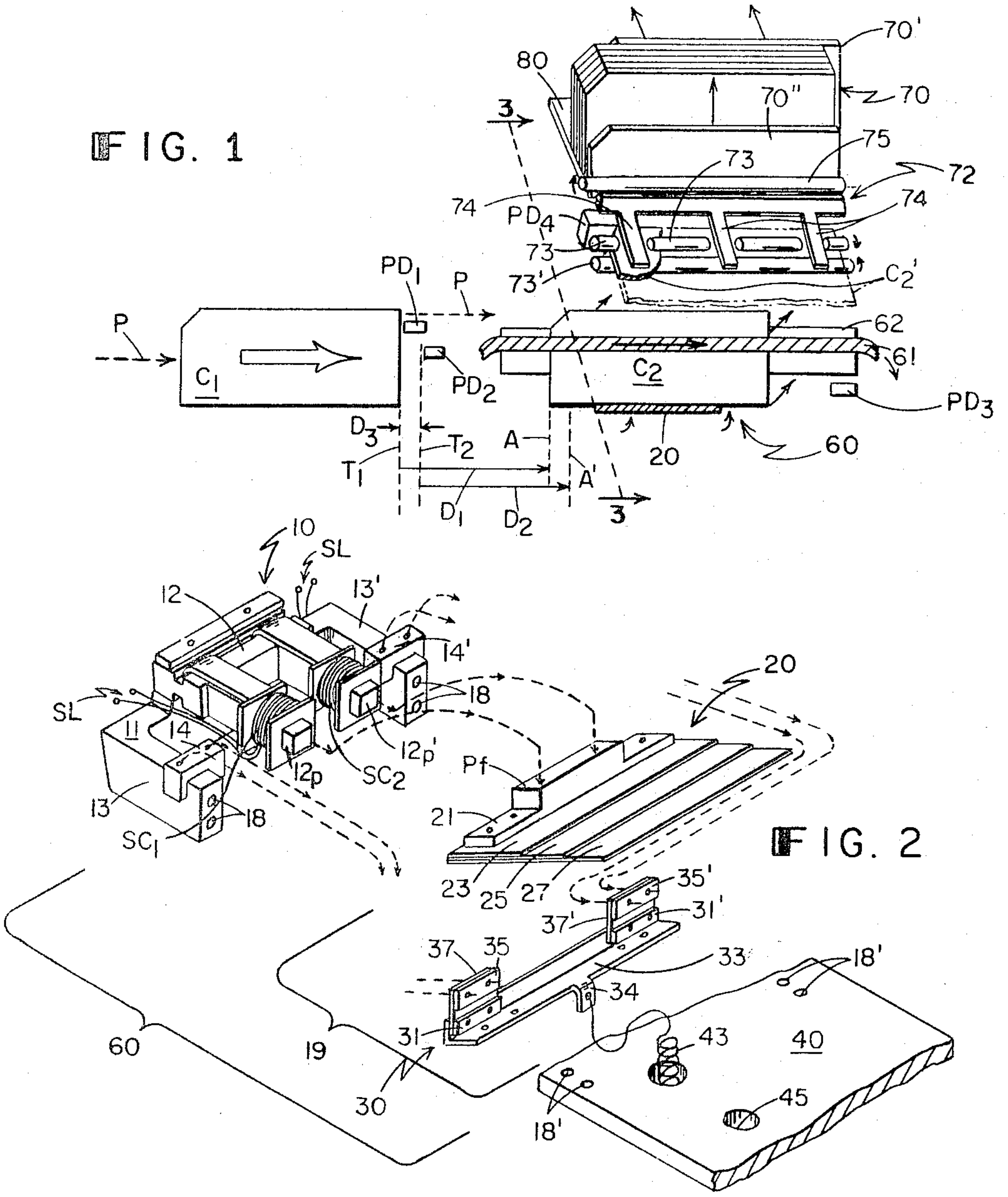
FIGURE 1 is a schematic perspective top view of a punched card ejection system according to a preferred embodiment of the present invention.
FIGURE 2 is an arcuately-exploded, perspective view of a solenoid-actuated card-thrust means adapted for employment in the system of FIGURE 1 according to the invention.

Referring first to FIGURE 1, there is here illustrated a preferred embodiment of a record transport apparatus which is adapted to act upon punched-card type unit records as they approach a solenoid actuated ejector 60 along a prescribed path P. That is, means are provided to thrust the cards transversely of path P into a stacking arrangement 72 for prescribed alignment in an output stack 70. The operative environment of the invention will first be described, with reference to FIGURES 1 and 3, both to inter-relate elements and to indicate their function, structural details being explained thereafter. It will become apparent that unit records, or documents, such as punched card C1, may be advanced along path P by means (not shown) which introduce them between a moving drive belt 61 and a smooth, stationary eject platform 62 in prescribed alignment. Resilient drive belt 61 is adapted, both to press the cards lightly against platform 62 and to advance them along path P in prescribed alignment, whence they may be thrust transversely to a stacking means 72 by a driven blade portion or kick-blade 20 of solenoid ejector 60. It may be assumed that drive belt 61 (shown only in part) is a conventional endless web, of rubber or the like. Belt 61 is somewhat narrower than the cards and arranged to be continuously driven at a prescribed speed, by pulleys (not shown) which are disposed to urge it downwardly against platform 62. Thus, belt 61 holds the cards against platform 62, while sliding them smoothly thereacross. Once a card has been engaged between belt 61 and plate 62, it is in a "ready-to-be-ejected" condition, as is exemplified by card C2. As explained below, the kick-blade 20 may then be energized at selected times to thrust the card, "on-the-fly," toward stacking means 72, i.e. while belt 61 is advancing it along the ejection platform 62.

Figures 3, 7:
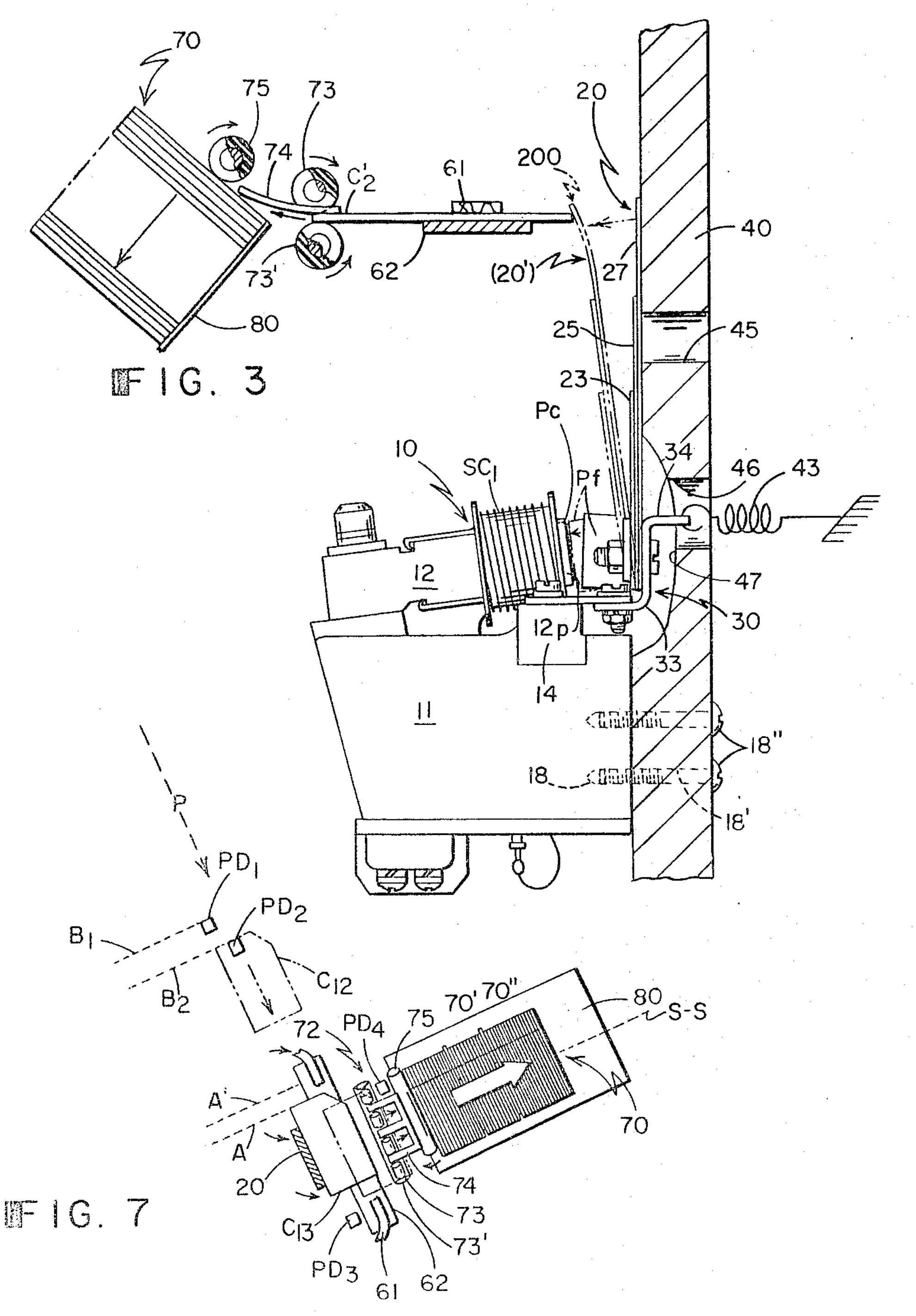
FIGURE 3 is a side elevation of the thrust means of FIGURES 1 and 2 in partial section along lines 3—3, as assembled and positioned relative to a backing plate and to stacking elements.
FIGURE 7 is a top view of an arrangement similar to that of FIGURE 1, but modified slightly.

Stacking means 72 comprises guide fingers 74, a pair of cooperating, constantly-rotating rollers 73, 73' and a keeper roller 75, best seen in FIGURE 3, all arranged to advance cards into a stack, or magazine, 70 of similar cards disposed upon a stacking platform 80. The thrust of rollers 73, 73' drives the cards against the stack 70 and thereafter into alignment therewith, being guided by fingers 74 and advanced into the stack by constantly-rotating keeper roller 75.

The approach of a card (e.g. C1) along path P may be detected by a pair of presence detector means PD1, PD2, which are adapted to detect the passage of cards at different prescribed locations, fixed at prescribed distances (D1, D2) from the ejector 60. As seen below, detectors PD1, PD2 may provide a timed control for both the "Normal" and "Offset" ejection of cards toward stacking means 72. Jam detection is provided by a pair of presence detectors PD3 and PD4. Detector PD3 is so located, relative to ejector 60, that by detecting the presence of a card, it indicates "card override" and thereby "Late," or defective, operation of ejector 60. Jam detector PD4 is adapted to indicate a "stacking jam" by detecting card-presence in stacker 72 at particular times during the ejection cycle. Thus, detector PD4 indicates whether a card, which has been thrust by kick-blade 20 to be advanced by continually rotating rollers 73, 73' has been properly (i.e. timely) advanced to be stacked. Detector PD4 is, therefore, interrogated as to: "whether a card is present after the time during which stacking should normally have occurred." Thus, when the presence of a card is detected by override detector PD3 or by stacking jam detector PD4 (at the proper interrogation time), suitable controls and indicators may be energized to indicate malfunction to the machine attendant and to automatically stop the transport system so as not to aggravate a jam condition by continuing to advance cards into the jam.

Card ejection may be very simply controlled by detecting the passage thereof adjacent presence detectors PD1, PD2, the output of which is employed, after the card has been advanced to ejection means 60, to initiate the ejecting thrust of kick-blade 20. In this way, a card (C2), being transported along eject platform 62, may be directed, "on-the-fly," by kicker plate 20 to stacker 72. For example, platform 62 is so disposed that such a transverse thrust on a card (C2) will drive it between stack rollers 73, 73' and finger guides 74, as FGURE 3 shows. Preferably, the pressure of drive belt 61 against the card (C2) and underlying platform 62 will be kept uniform and yielding enough so that the card is diverted "cleanly" and enters stacker 72 evenly (as at C2'), without being skewed. Cards are transported along injection path P; and belt 61 and kick-blade 20 are disposed, so that cards (C2) project sufficiently beyond platform 62 to accommodate the diverting thrust of blade 20, this thrust being sufficient to engage the card with stacker 72. This arrangement should be such as to bring card-edges closely adjacent blade 20 so that very little solenoid-thrust is wasted when solenoid 10 starts to move plate 20. This propinquity (card-edge to blade 20) will also assure parallelism therebetween, thus assuring card-alignment during diversion and engagement with stacker 72.

Actuation of kicker or ejector 60 will be seen to be asynchronous, i.e. time-independent with respect to the other card-manipulating means, such as belt drive 61 and stacker 72. The compound ("on-the-fly") motion imparted to cards as they are diverted by kicker 60 is indicated by arrows in FIGURE 1 (and, for a modified embodiment in FIGURE 7). That is, the arrows from card C2 indicate that, when diverted by kicker blade 20, the diversion path of the card (C2) will resolve two components of motion, i.e. the motion along its original path P provided by belt 61 and the transverse motion towards stack 70 provided by blade 20.

*Ejector control, in general*

As discussed below, ejector 60 is of the solenoid-actuated type, the initiation of which is especially adapted to be controlled, asynchronously by electrical signals provided by presence detectors PD1, PD2. Detectors PD1, PD2 may comprise conventional photo-transducer units energized by suitable illumination means (not shown). This eject-control will become more apparent upon consideration of the circuit indicated in FIGURE 4, but in general, will be understood to govern the initiation time of kick-blade 20 so that it thrusts cards (e.g. C2) from platform 62 at prescribed times, corresponding to prescribed intended positions in stack 70. For example, the output of Normal detector PD1 may be used to provide a "Normal" stacking position, while the output of Offset detector PD2 may alternatively initiate Offset stacking alignment (e.g. at 70'), according to certain control logic. This logic may cause the output of PD2 to initiate blade 20 at a different (e.g. later) time than for Normal stacking. Normal ejector control PD1 may be located a suitable distance D1 from its associated eject position, i.e. from axis A. Axis A thus locates the prescribed position of a trailing card-edge when "Normal-eject" is to be effected; from which position cards will be normally "kicked" into stacker 72. Thus, suitable electrical controls (indicated below) may be provided so that when Normal photo-detector PD1 indicates (i.e. is uncovered by) passage of a trailing card-edge, a signal will be generated for initiating blade 20 at the time when the trailing card-edge falls along axis A, given prescribed transport speeds between PD1 and axis A. In a similar manner Offset detector PD2 is located a prescribed distance D2 from "Offset axis" A', the proper trailing card-edge position for Offset eject mode. This asynchronous ejection control is a feature of the invention; one which both makes "on-the-fly" ejection practical and is especially adapted for use with solenoid-ejector means of the type shown. Thus, according to the invention, an Offset control (e.g. presence detector PD2) may be spaced a prescribed distance D3 along card path P from Normal ejector control PD1 corresponding to the desired Offset spacing. Of course, PD2 may be located either upstream or downstream of PD1, depending upon which type of Offset is desired, leading or lagging. Suitable control logic arrangements, for instance, as shown in FIGURE 3, will allow the output signal from Offset detector PD2 (indicating passage of card C1) to differently control the actuation of kick-blade 20, thus causing the ejection of a card from stacking platform 62 at a time somewhat later than that indicated by Normal ejection control PD1. Thus, when the "Offset control" is invoked, detector PD2 may in the manner of normal detector PD1, generate a signal which commands ejector 60 to kick the card from the "Offset" position along plate 62, indicated by trailing-edge axis A' (illustrated card C2 being shown in the "eject-for-no-offset" position, however).

*Ejector device*

The structure and operation of ejector 60 is best shown by FIGURES 2 and 3. Functionally, ejector 60 constitutes an electrically-energized, solenoid-actuated document translation means. Ejector 60 may preferably comprise a solenoid, or electromagnet, portion 10 and an armature portion 19, which is flexibly mounted on the housing of solenoid 10 so as to present an armature pole P*f* in spaced, driven relation to a pair of solenoid pole pieces 12P, 12P'. Armature 19 includes a multipart kick-blade 20 carried by armature pole portion P*f*. Blade 20 is disposed to be held in abutting coplanar relation with a fixed backing plate, or wall, 40 (not shown in FIGURE 1) in its unactivated, "rest" state. Solenoid 10 comprises a bifurcated, U-shaped field piece 12 of readily magnetizable (preferably ferro-magnetic) material fixedly mounted on a stationary block 11 of non-magnetizable material. Field piece 12 includes a pair of legs terminating in a pair of relatively identical flat-faced pole pieces 12P, 12P', the legs being wrapped with a pair of oppositely-wound field coils SC1, SC2, respectively. Thus, pole pieces 12P, 12P' are oppositely magnetized in a convential manner. A pair of lead terminals SL supply current to coils SC1, SC2. A pair of mounting plates 14, 14' are provided on block legs 13, 13', respectively, being disposed "outboardly" about pole pieces 12P, 12P'. As described below, mounting plates 14, 14' may be somewhat oblique with respect to the normal to the flat, parallel engaging faces of pole pieces 12P, 12P' for purposes of mounting the armature P*f* to pivot into proper "mating" relation to the pole pieces 12P, 12P'. Thus, as seen in FIGURE 3, poles 12P, 12P' are mounted relative to plates 14, 14' and pole P*f* is so coupled thereby, that the flat faces of solenoid poles 12P', 12P are disposed to be so oblique relative to the face of armature pole P*f*, allowing these faces to mate, and be relatively coplanar, when pivoted into engagement. Solenoid poles 12P, 12P' are preferably each provided with outer pole covers P*c* to engage armature pole P*f*.

Pole covers P*c* provide a minute high-reluctance gap between poles 12P, 12P' and pole P*f*, to overcome any residual magnetism therein and facilitate the quick, easy disengagement thereof. Thus, covers P*c* should comprise a non-ferromagnetic (preferably dia-magnetic) high-reluctance material, beryllium copper having been found very suitable for this purpose. It is preferred that poles 12P, 12P' be made relatively large in cross-sectional area, both to reduce wear (by reducing impact pressures thereon) and to provide a large cross-sectional area for the low-reluctance transfer of magnetic flux to armature pole P*f*.

A magnetizable armature portion 21 of blade 20 is suspended through a flexible coupling means 30 from solenoid block 11 so as to present armature pole P*f* in prescribed spaced relation to solenoid poles 12P, 12P'. Armature 21 is comprised of readily magnetizable, preferably ferro-magnetic, material. Pole piece P*f*, protruding from armature 21, is formed to continuously engage the entire facing surfaces of solenoid poles 12P, 12P' when attracted thereto by the magnetic field thereof, resulting from the passage of current through coils SC1, SC2. FIGURE 3 shows this "actuated" mating engagement, in phantom. The cross-sectional area of armature pole P*f* is arranged to be somewhat larger than that of solenoid poles 12P, 12P' together and also to bridge the inter-pole space therebetween. Thus, any loss of fringing magnetic flux emanating from the solenoid poles will be minimized, since wider pole P*f* provides a low-reluctance return-path therefor. Armature pole P*f* thus efficiently completes the magnetic flux circuit between solenoid poles 12P, 12P' as a minimum-reluctance magnetic shunt.

It will be seen that armature 21 is suspended by coupling 30 to pivot pole P*f* in a somewhat compound motion against the faces of solenoid poles 12P, 12P'. That is, when pole P*f* is attracting from its rest position (full line in FIGURE 3), it will be pivoted on resilient coupling 30 to move slightly downward and toward poles 12P, 12P'. The relative disposition of poles 12P, 12P' and pole P*f* and the angular relation of the mating faces thereof will be seen to assure continuous pole-engagement when blade 20 pivots toward solenoid 10 on flexure coupling 30. The inter-pole gap, i.e. between armature pole P*f* and poles 12P, 12P' (with covers P*c* thereon), determines the attractive force therebetween according to a well-known inverse-square relation and is thus a critical factor in the speed and force of blade actuation. Thus, an adjustable clamp means (not shown) may be provided to make this gap adjustable by moving pole piece 12 relative to solenoid block 11. The air gap thus introduced can be used to control the operational speed and thrusting force of the blade 20.

As FIGURE 2 shows, armature 21 constitutes a base portion on which is fixedly mounted a multi-part pusher blade assembly 20. Blade 20 comprises a plurality of overlying flexible, blade segments, or leaves, 23, 25 and 27. The assembly comprising blade 20 is, in turn, fixedly mounted along one side of "right-angle" header portion 33 of coupling 30. Header 33 is, in turn, adapted to be resiliently coupled to solenoid block 11 through a pair of flexure leaves 37, 37'. Flexure leaves 37, 37' are fixedly clamped, at one end, to one side of angular head 33 by lates 31, 31' so as to project transverse to the plane of blade 20. The other ends of flexure leaves 37, 37' are similarly clamped, with plates 35, 35' and suitable bolts (not shown) upon plates 14, 14' of solenoid block 11.

Flexure leaves 37, 37′ preferably comprise thin, flat spring-steel plates which are relatively rigid along their planes, but are relatively resilient along the normal thereto. Plates 35, 35′, plates 31, 31′ and coupling base 33 may comprise rigid metal stock, suitably formed.

The lateral rigidity provided in the flexible coupling leaves 37, 37′ is also advantageous, in that, unlike articulated internally-movable pivots, it resists lateral displacement or twisting which could misalign the ejector blade 20 and cause improper record diversion.

While header 33 is shown as "right-angular" and surfaces 14, 14′ are shown slightly "out-of-normal" with respect to the faces of poles 12P, 12P′, it will be apparent that either, or both, of these angular dispositions may be changed so long as, together, they arrange the faces of the armature pole P*f* and solenoid poles 12P, 12P′ to the confronting in coplanar, contiguous engagement. Similarly, the attitude of the mating face of armature pole P*f* may be modified to accommodate such changes.

Thus, with kick-blade 20 and flexure leaves 37, 37′ affixed to coupling 30 in orthogonal relation, it will be seen that blade 20 may be pivotably driven and armature pole P*f* thrown into, and out of, engagement with pole faces 12P, 12P′ without the use of abrading pivot means. This eliminates wear points and other frictional components subject to wear. The flexible coupling 30 provided by resilient leaves 37, 37′ is virtually wear-free, being kept within its stress limits by stopping engagement against poles 12P, 12P′, on the one hand, and against backing plate 40, on the other. Since FIGURE 2 shows parts exploded arcuately (over about 90°), it will be apparent that, with the armature-containing blade 20 affixed to coupling 30 (which, in turn, is affixed on solenoid block 11), block 11 is intended to be affixed, at points 18, 18′, to plate 40, such as by bolt means 18″ and registering holes (see also FIGURE 3).

*Blade*

The multi-part blade comprised of blade segments 23, 25 and 27 is adapted to be flexible and resiliently actuable, as indicated at 20′ in FIGURE 3, for instance. The overall blade 20 is thus adapted to mechanically amplify the short thrust imparted by the magnetic attraction of armature pole P*f* against solenoid poles 12P, 12P′ so as to elongate actuation-excursions by virtue of its inherent resilience. This mechanical amplification is effected, according to the invention, by forming blade segments or resilient foils, 23, 25 and 27 of thin, normally-resilient plate stock, preferably spring steel or the like. Such a leaf spring structure has great lateral rigidity (i.e. rigid in its own plane).

It will be apparent to those skilled in the art that many advantages accrue from the employment of such a resilient blade. For instance, while it is efficient and convenient to employ short-stroke solenoid actuators for card-thrust purposes, these actuators operate inefficiently over long distances, and are not, of themselves, adapted to provide a guiding thrust which "follows" a card any appreciable distance. This can be important, for instance, to assure that an ejected card (e.g. C2 in FIGURE 1 and C2′ in FIGURE 3) is kept aligned properly, and not skewed, en route to the stacker. For example, such a skew might otherwise result due to unequal gripping pressures from belt 61. Thus, the use of a flexible blade 20 allows efficient employment of solenoid actuator mechanisms which are enabled to extend actuator thrust over long distances and maintain contact with the impelled document to assure that it reaches its destination in prescribed alignment. While such a result might be achieved with a pivotable blade, it will be recognized that the resilient flexible blade according to the invention is not subject to the frictional wear endemic to prior art pivot structures which have metal-to-metal wear points and thus the invention also eliminates lubrication and other maintenances.

In certain alternative arrangements, it may be preferred not to continuously guide documents en route to the stacker, but instead remove contact to allow the card to "fly" freely. Such a "free-travel zone" might be provided, for instance, to allow card-deceleration prior to engagement with the whirling rollers 73, 73′ of stacker 72. This would allow greatly increased card-acceleration by kicker 60 according to the invention, without requiring a corresponding increase in stacker roller speeds. Another feature of resilient blade 20 is that its resilient leaves are stacked in overlying, cantilevered fashion. Thus, leaves 23, 25, 27 are fixed upon a common armature-base 21 to project different, prescribed progressively increasing effective lengths from this common pivot base. Thus, is provided an outwardly tapered, i.e. progressively-elongated, blade 20. This cantilevered construction is one which derives several advantages especially useful in the manipulation of computer documents. Such a construction provides strength over an extended overall blade-length and distributes the flexure stresses of the overall blade over a broader area, thus reducing the stress concentration, and resultant likelihood of blade fatigue, at any one blade-sector. Thus, the invention avoids stress concentrations leading to breakage, deformation and loss of elasticity of blade members. The wear resistance thus provided is critically important at the unusually high aceleration rate attainable with this solenoid structure and can mean the difference in blade "life" between millions of cycles and a few hundred thousand (for a conventional single-leaf blade).

Since the blade leaves may be interconnected at only one end (e.g. adjacent armature piece 21) it will be apparent that, under high acceleration, the blades (23, 25, 27) may separate adjacent their outer tips, thereby allowing a quick "segmented" or incremental acceleration of blade leaves individually. Such has been observed, it appearing that armature 21 at first pulls blade 23 away from blade 25, and then pulls blade 25 away from blade 27, thereafter letting the blades close in a "slapping" action. This slapping action, or "stepped-acceleration," releases a major portion of stored energy at the end of the thrust to accentuate the "whiplash" effect whereby blade tip 200 "follows" a card (of FIGURE 3). Additionally, this strengthened construction provides a lighter blade which, though strong, has a low-torque mass/distribution which places most of the blade-mass close to the pivot point. Thus, it is a feature of the invention that it provides a tapered record-diverting blade, which, whether multi-part or solid, acts to reduce the load presented by the blade, to better distribute stresses therein, to amplify the resiliency thereof at the working tip thereof and provide a whiplash action and the like. Thus, such a blade is especially adapted for actuation by solenoid devices which are most efficient at light, low-torque loads. Therefore, the multi-blade, segmented construction of the invention provides maximum blade flexibility and blade-excursion where it is most needed, at the extremity of the blade 20 and adjacent the impelled card (e.g. C2).

It will be apparent from FIGURE 2, and especially from FIGURE 3, that kick-blade 20 is arranged to be positioned closely adjacent a backing plate 40 in its rest (i.e. quiescent, or unactivated) state; the activated state being shown at 20′ (along the dotted line) in FIGURE 3. More particularly, the rear surface of rear blade 27 continuously contacts wall 40, in coplanar, conforming relation. Besides advantageously providing a stop limit for the actuator assembly, this disposition of backing wall 40 can more quickly bring blade 20 to quiescence after actuation by damping out any sympathetic vibrations thereof. Thus, it is a feature of the invention that a backing wall 40 is disposed in continuous, coplanar contiguity with the ejector blade. It has been found that this coplanar abutment of blade 20 against a portion of backing plate 40, with litle or no perceptible gap therebetween, provides an extremely efficient damping action. Thus, after blade 20 has been actuated and flexed thrustingly (into position 20'), it co-acts in its "return" mode with abutting plate 40 to produce a "quasi-dash pot" effect, creating a pneumatic drag resisting any following, reactive thrusts of blade 20 and helping to quickly return it to "rest."

Such a damping will be recognized as important in the art of record actuation since the frequency of "card-thrust" is limited by the "relaxation-time" required to restore the actuator (e.g. blade 20) between thrusts. By reducing this relaxation time, the arrangement of blade 20 against plate 40 increases the capability of actuator 60 for high frequency operation. To allow this close engagement of blade 20 with backing plate 40, plate 40 is relieved at a recess 47 to receive a protruding tab portion 34 of coupling 33. Recess 47, in turn, is provided with a bore 46 through plate 40 to accommodate tab 34 and a return spring 43 connected thereto. Tab 34 may comprise an extension of coupling base 34 adapted to engage the return spring 43. Spring 43 may comprise a conventional helical extensible tension spring, and is anchored to a stationary structure (not shown).

It has been found, moreover, that the above-described damping co-action of blade 20 with backing plate 40 can be accelerated and optimized by addition of bleed-aperture means, such as a bleed hole or vent 45 in FIGURES 2 and 3. In cases where the above arrangement of blade 20 and wall 40 "overdamps" blade 20, temporarily creating an unwanted pneumatic pressure therebetween, the damping process can be accelerated and higher cycle rates accommodated by controllably exhausting air through vent 45.

Vent 45 may serve another purpose, that of reducing starting drag on blade 20. When solenoid 10 starts to drive blade 20 against card C2, a pneumatic pressure-differential can develop between the two extended surfaces until an appreciable gap is introduced between blade 20 and plate 40. Such a resistance may be characterized as a "static" air-drag upon blade 20 in that it arises somewhat after blade 20 has come to rest against backing plate 40. This is in contradistinction to the above "dynamic" air-drag, or damping, provided by the returning engagement of blade 20 with backing plate 40. It has been found, therefore, that this undesirable static (or starting) drag as well as the dynamic (stopping) drag, can be virtually eliminated by the provision of the relatively small vent 45 through backing plate 40. Thus, for instance, for an overall blade configuration of about seven inches by five inches, a vent 45 of about one-half inch diameter and located relatively central of blade 20 has been found satisfactory.

*Operation*

Although the above description is indicative thereof, the operation of the described embodiment, will be recapitulated for purposes of greater clarity. Thus, referring especially to FIGURE 1, the advance of a card (C1) along path P towards the ejection platform 62 will cause the trailing-edge thereof to cover and uncover presence detector means, namely "Normal" ejector control PD1 and "Offset" control PD2, sequentially. For "Normal eject" the output of PD1 is applied to the solenoid of ejector 60 so that blade 20 strikes the card when it has been advanced by belt 61 to "Normal-eject position" on platform 62, i.e. with its trailing-edge aligned with the Normal ejection axis "A" (as with card C2 in FIGURE 1). Thus, ejector 60 will be energized to thrust the card transversely of its path along plate 62 and into engagement with stacking means 72 (as depicted for card C2' in FIGURE 3). To effect this, the output from detector PD1 will, at this "eject-time," cause the energization of solenoid coils SC1, SC2, thus magnetizing poles 12P, 12P' to attract armature pole P*f* into engagement therewith. This movement of pole P*f* carries blade 20, pivotingly on flexure coupling 30 to drive the card towards stacker 72, "on-the-fly" in an oblique, compound motion. The flexing sweep of the blade tip 200 (at 20') will maintain positive engagement thereof with the card until it is engaged by continuously-rotating stacking rollers 73, 73'. Rollers 73, 73' advance the cards against the stacked card-array 70 or a card weight (not shown) while continuously rotating retaining roller 75 urges the cards into stacked alignment and maintains them there. The inherent resilience of blade 20, together with the tensional urging of return spring 43, act to return blade 20 quickly into abutment with backing plate 40. At plate 40 a pneumatic damping effect will prevent secondary vibrations and quickly bring blade 20 to "rest," bleed hole or vent 45 accelerating this damping.

If Offset ejection is desired, rather than the foregoing Normal ejection mode, an Offset command will enable Offset detector PD2 to control the activation of blade 20 in the same manner as indicated for Normal ejection above, though at a different time, namely, when the trailing card-edge reaches Offset axis A'. This ejection offsets cards as indicated at 70'. As indicated the separation distance D3 between presence detectors PD1, PD2 is a factor in controlling the degree of Offset (e.g. of card 70' from stack 70); another factor being the circuit logic controlling ejector activation, as explained below. Ejection time, of course, may be changed by changing any of: the position of detectors PD1, PD2; the solenoid attracting force (e.g. pulse gap length); belt speed; kicker blade position—or by introducing variable delay means in the control circuit.

*Control circuit*

Figure 4:
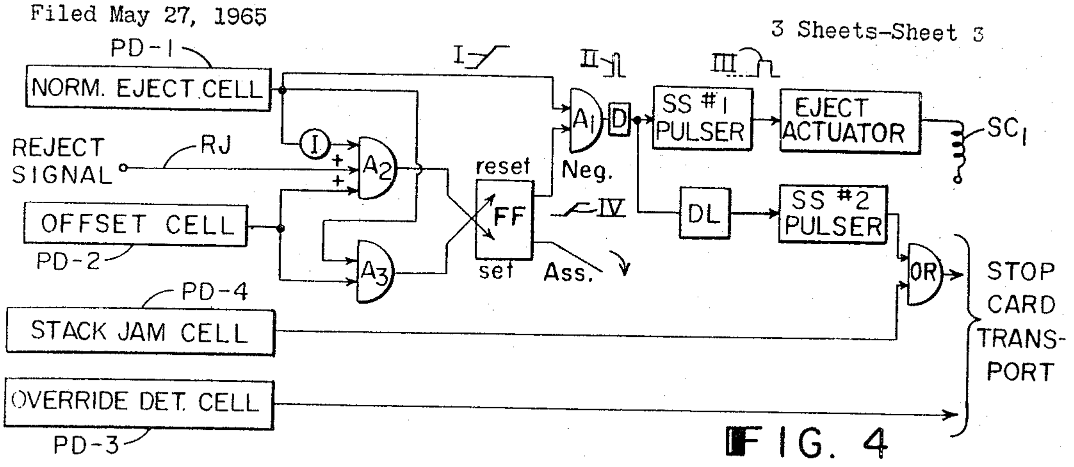
FIGURE 4 is a schematic block diagram showing an arrangement of electronic control means associated with the system of FIGURE 1.
Figure 5:
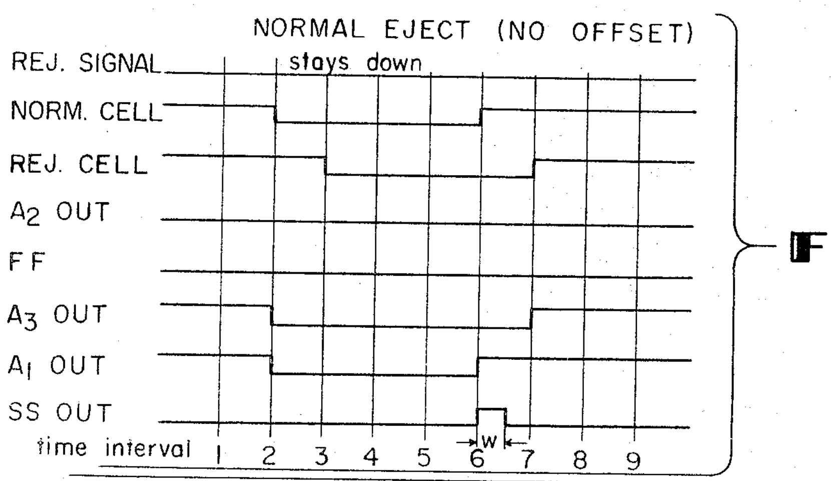
FIGURES 5 and 6 are timing charts indicating the operation of the arrangement in FIGURE 4, FIGURES 5 and 6 relating to Normal and the Offsett stacking modes respectively.

FIGURE 4 shows a schematic block diagram form of an electrical control circuit illustrating the controlled activation of ejector 60 by signals from eject control detectors PD1, PD2 and the interrelated outputs from a pair of jam detector means PD3 and PD4. The structure indicated by this logical design will become apparent upon the following description of its operation, especially as related to the output waveforms indicated in FIGURES 5 and 6. In the absence of a passing card, the "normally-active" photo-transducer of detector PD1 will normally impress signals upon a plurality of AND gates A2, A3 and A1. This signal is inverted, as indicated, before application to gate A2 to "enable" gate A2 only when detector PD1 is covered. Gate A2 will normally remain closed, or "down," in the absence of both a reject signal along an input line RJ and an "uncovered" output from detector PD2. A bistable flip-flop FF is normally "on" (Negate) such as to enable gate A1. Gate A1 will be normally "closed" effectively, however, until it is presented with a rising input pulse, which will cause a positive pulse to be emitted by a differentiator D, which may comprise a suitable R–C (or R–L) differentiator. The passage of the leading edge of a card (C1) over detector PD1 ("Normal-eject" cell) will remove the signal applied to gate A1. Gate A1 will be kept "closed" thereafter until the trailing card-edge again uncovers PD1 for re-application of an "uncover" pulse to A1. This "uncover-pulse" will comprise a rising signal so as to provide an A.C. output which can fire differentiator D to, in turn, trigger a pulsing means SS1. Pulser SS1 may comprise a single shot multivibrator which, in turn, can generate an activation current pulse of prescribed duration to be applied to solenoid coils SC1, SC2 of ejector 60. It will be evident that the system must accommodate a "card-transit" time, wherein the trailing edge of a card (C1) travels from detector PD1 to "Normal eject" axis A, i.e. across distance D1 in FIGURE 1. The energization time required to impel kick-blade 20 against a card (C2) and other delay periods inherent in the control circuit may absorb this "card-transit delay," which may be made variable, of course. Where desired, a variable delay means may be provided at the input of SS1. Thus, eject time will be a function of these delays and may be modified by changing the card transit time (i.e. transport speeds or location of PD1) or adjusting suitable electrical delay means as noted above. The above operation is indicated diagrammatically by the waveforms of associated members as indicated in FIGURE 5.

Figure 6:
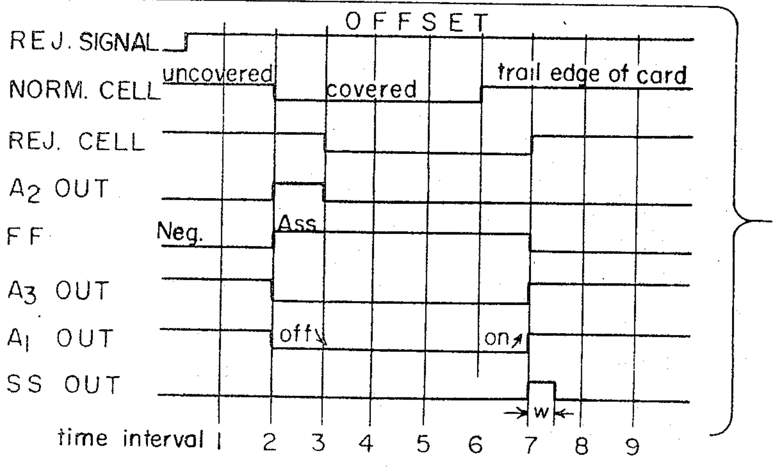

The "Offset mode" is provided as follows, with reference both to FIGURE 4 and to the relevant waveforms in FIGURE 6. It will be assumed that the card handling control means has, at this time, decided that a designated card (C1) is to be "Offset," e.g. because it is a reject card, a marker card, etc. Thus, when card C1 approaches the first ("Normal-eject") presence detector PD1, the "reject signal" will have been applied along line RJ and an "uncovered" output will emanate from detector PD2, both enabling gate A2. Hence, when the leading edge of card C1 covers normal cell (PD1), gate A1 will again be closed and the disabling signal from PD1 will be removed from gate A2 which may then "set" flip-flop FF (to "assert" state), thus, disabling gate A1 The passage of the trailing card-edge over both Normal detector PD1 and Offset detector PD2 (Rej. cell) enables AND gate A3 which may then "reset" flip-flop FF, switching it to its "gating" (or "Negate") state, which presents a rising output on gate A1 (already enabled by uncovered cell PD1), to trigger an output from differentiator D.

Note that unlike "Normal mode," when the trailing card-edge uncovers the Normal-eject cell PD1, gate A1 is still "disabled," flip-flop FF having been switched to nongating state by the output from gate A2 Therefore, gate A1 cannot "open" until flip-flop FF is "reset" into its gating state by the output from AND gate A3. Gate A3 will thus "reset" FF to initiate an eject-pulse from SS1 when both detector cells are uncovered, i.e. when "downstream" Detector PD2 becomes uncovered (cf. time interval #7 FIGURE 6).

Thus, in summary, the logical arrangement shown in FIGURE 4 provides that, for "Normal eject" the ejector 60 will be energized when a trailing card-edge uncovers normal cell PD1; whereas, when a "reject signal" is applied, ejector 60 will, instead, be energized (slightly later) when Offset cell PD2 is uncovered. It will be recognized that this arrangement provides a very simple eject control means. For instance, the amount and type of Offset may be controlled by simple means, such as adjusting delay means in the circuit, interchanging detector outputs, repositioning the detectors PD1, PD2 or the kick-blade 20, changing transport speeds, or the like. For instance, by merely moving blade 20 slightly farther away from platform 62, a constant "kick-delay" will be introduced which by ejecting cards later, will reposition the output stack 70 and the associated offset cards (70') to the right (FIGURE 1) a prescribed uniform amount. An electronic delay could also effect this very convenient coordinated repositioning of stacked cards with the invention.

The ejection pulses to SS1 are also applied along a "jam-detect" line, being delayed at a delay means (DL), applied to a pulse-generating pulser SS2 and then ANDed at a gate OR with the output from stack-jam detector PD4. Delay DL assures that stack-jam condition will be monitored at a predetermined (delay) time after a document has been ejected, this time being sufficient to assure that proper ejection operation will have thrust the card beyond detector PD4. Thus, the output from gate OR indicates an "error condition" at stacker 72, and may be used to stop the card transport means, preventing succeeding cards from being thrust into a "stacker jam." A similar error condition is indicated by the output pulse from override detector cell PD3 which indicates, as aforementioned, that a card has proceeded too far along eject plate 62 ("late kick") and thus cannot be properly ejected. Provision of these simple jam, or error, detection controls is facilitated by the novel card diverter means and the associated control means according to the invention.

It will be readily apparent to those skilled in the art that the principles of the invention may be implemented in other different ways. For instance, the invention may be modified to offset cards to the left, as is FIGURE 7, as well as to the right as in FIGURE 1. Thus, in FIGURE 7 the first presence detector PD1 is shown as detecting for "Offset" while following detector PD2 detects for "Normal ejection," these detectors being spaced a suitable distance which, together with any electronic delays, will produce a prescribed amount of Offset (cards 70"). Similarly, although a particular form of presence detector (photoelectric) has been indicated, it will be apparent to those skilled in the art that other equivalent detector means may be used and that the detector means may, additionally, provide a variable delay for changing "Offset" and "Normal-eject" positions along platform 62, alone or together. In some cases, platform 62 may be eliminated, for instance where the card-drive keeps cards aligned, such as with a translating card-pickup with a suction grip. While particular card translation means have been shown and described, it will be evident that other equivalent means may be substituted. For instance, stacker 72 may be replaced by any equivalent means adapted to stack unit records in prescribed positions, according to the position of engagement therewith. Belt 61 and platform 62 may be replaced by equivalent means which advances documents along a prescribed ("eject") plane in uniform resilient engagement therewith. Ejector 60 may be replaced with an equivalent actuator means controllable to transversely thrust cards quickly and asynchronously, preferably being also able to "follow" cards over substantial excursion distances.

As indicated, the arrangement schematically shown in FIGURE 7 is an alternative slightly modified embodiment to that described above and shown in FIGURE 1. It will help to clarify the teaching of the invention to functionally describe the elements in this alternate embodiment. It will be understood here that the operation of this embodiment is similar to that described above except for those details that are particularly mentioned. Thus, it will be apparent that, similar to the operations indicated in FIGURE 1, punched card records may be advanced along a first path P to be diverted substantially transversely, and "on-the-fly," by resilient actuator blade 20 toward stacking means 72. Stacker 72 is adapted to urge the cards (as above) onto a stacking platform 80 along a stacking direction S—S, substantially transverse to original path P. As before, the passage of cards C12 across the presence detecting eject controls, PD1 and PD2, will serve to activate them, for instance, by interrupting and re-presenting incident light to photocell means therein. Output signals from PD1 and PD2 may control the following actuation of kicker blade 20 for prescribed card diversion. Thus, card C12 is shown (in phantom) just beginning to uncover detector PD2 with its trailing edge. Here, detector PD2 is employed for Normal-eject control, being aligned along axis B2. Thus, for Normal ejection, when detector PD2 is uncovered, it will present a signal to actuate blade 20 to hit the card at a time corresponding to the arrival of the trailing card-edge at Normal ejection axis A, as represented by card C13.

As before, cards are advanced along ejection platform 62 by resilient belt 61 which holds them against platform 62 in positive yielding engagement. Thus, the spacing of Normal detector PD2 from Normal-eject axis A together with any electronic delays will serve to energize blade 20 to thrust the card into engagement with stacker 72 at a time causing it to be stacked in "Normal" alignment. Thus, the signals from Offset detector PD1 will be ignored unless (as before) an "error" ("reject") signal is presented to the electronic controls; in which case the uncovering thereof will provide an earlier energizing signal to kick-blade 20. Thus, the output from PD2 will energize kicker 20 to hit cards at a time corresponding to the arrival of a trailing card-edge at Offset-eject axis A′. This will cause ejector blade 20 to eject the card slightly earlier than for the "Normal" mode, so that stacking means 72 will align it in the Offset mode, represented by cards 70″. Thus, it will be apparent that the combined detection-ejection controls, according to the invention may be modified in various ways to provide a versatile simple, quick-acting system, able to divert unit records from a prescribed travel path into prescribed, variable, stack positions.

While in accordance with the provisions of the statutes, there have been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as novel and for which it is desired to secure Letters Patent is:

1. In a data processing system including input means for presenting computer unit records along a prescribed path and a record advancing station located adjacent said path, the combination therewith of intermediate record diversion means comprising:

record transport means for advancing said records along said path at a prescribed speed and along a prescribed reference surface adjacent said station, said transport means being adapted to engage said records resiliently so that at least a portion thereof projects transverse said path opposite said station; asynchronous ejector means disposed adjacent said surface so as to thrust said projecting portion of said records transverse to said path, "on-the-fly," and into engagement with said station; and document detector means disposed along said path intermediate said input means and said ejector means, said detector means being connected to apply control signals to said ejector means for initiation thereof in response to the passage of records adjacent said detector means.

2. In a unit-record handling system including input means for presenting records aligned along a prescribed path and a record stacking station including stacking means located adjacent said path, the combination therewith comprising an on-the-fly record redirecting means for transporting said records between said input means and said stacking means without substantially arresting the motion thereof, said redirecting means comprising in combination:

record advance means for advancing said records along said path at a prescribed speed and along a prescribed reference surface, said advance means being arranged to resiliently engage said records so that an edge portion thereof protrudes therefrom transverse to said path;

record diverter means disposed adjacent said area and adapted to thrust records asynchronously transverse to said path being adapted for driving engagement of said protruding edge portions, whereby to effect the diversion thereof, on-the-fly, into engagement with said stacking means;

and record-presence detector means disposed intermediate said input means and said diverter means along said path and arranged to energize said diverter means in response to the passage thereby of prescribed terminal edge-portions of said records.

3. A method of translating punched cards between an input station which aligns said cards along a prescribed path and a stacking station located adjacent said path for stacking said cards along a direction relatively normal to said path, said method comprising in combination:

resiliently engaging said cards with translation means and advancing said cards along said path therewith at a prescribed speed and aligned along a prescribed reference surface by said means;

detecting the passage of said cards prior to the approach thereof adjacent said stacking station to develop control signals;

and applying said signals asynchronously to ejector means adapted to thrust edge portions of said cards relatively transverse to said path and somewhat normal to the associated edges so as to cause said ejector means to thrust cards into prescribed alignment with said stacking on-the-fly and without impacting said cards against separate fixed stop means station.

4. A method of stacking punched cards in selectable stacking modes by means of transport means between an input means arranged to present cards aligned along a prescribed path and a stacking means, said stacking means being engageable with said cards in a first direction transverse to said path and adapted to align cards according to the position thereof when engaged thereby; said transport means comprising in combination:

an alignment station disposed along said path adjacent said stacking station and including a smooth flat platform, and an ejector means disposed adjacent said platform for engagement with said cards and adapted to thrust said cards, on-the-fly, into engagement with said stacking means, said method comprising the steps of:

advancing said cards at a prescribed speed along said path from said input means and across said platform so as to be resiliently urged against said platform and so that an edge portion thereof protrudes therefrom in a second direction opposite said first direction;

photoelectrically detecting the passage of presecribed edges of said cards past a plurality of control-detector positions along said path so as to produce control signals;

applying said signals to energize said ejector means for thrusting said edge portion at one of several times corresponding to one of several eject positions along said platform, which positions, in turn, induce one of several different axial alignments by said stacking means.

5. Document transport apparatus for transferring documents from an input station to an output station along a compound path therebetween, said documents being advanced along a prescribed input path at said input station, said apparatus comprising in combination:

an alignment platform disposed adjacent said output station and adapted to receive documents from said input station in prescribed alignment with respect to said output station; a flexible belt transport means for receiving documents from said input station and transporting them at a prescribed speed along a prescribed diversion path across said platform, being adapted to resiliently urge said documents against said platform; diverting means disposed adjacent said platform and adapted to thrust said documents edgewise out of engagement with said transport means and into engagement with said station without necessarily dissipating their original kinetic energy; and a detecting station positioned along said input path for controllably energizing said diverting means in response to the passage of said documents therepast.

6. In a data processing machine adapted to coact with unit records advanced successively therethrough wherein said records exhibit conditions whereby they may be advanced by output means along different output paths according to the sensing of said conditions by classification means, the combination therewith comprising:

record feeding means adapted to continuously advance said records at a predeterimned speed along a predetermined processing input path; detector means for developing control signals in response to the passage of said records along said input path; diverting means adapted to divert said records relatively transverse to said input path without substantially affecting their motion therealong and control means adapted to selectively modify the output from said detector means to energize said diverting means at times corresponding to prescribed alignment of a subject record along one of said output paths, said alignment being indicated by said classification means.

7. The combination recited in claim 6 wherein said detector means comprises a normal-eject detector means and an offset-eject detector means;

and wherein said control means comprise energization means connected between said normal eject detector means and said directing means for initiation thereof in response to prescribed signal pulses applied thereto, offset signal means adapted to present a signal commanding offset ejection, offset gating means connected to receive inputs respectively from said normal eject detector means from said offset-eject detector means and from said offset signal means and to emit a disabling pulse therefrom for reversibly disabling said energization means and offset enabling means connected between said offset detector means and said gating means for presenting a reset enabling pulse to said gating means to terminate said disabling pulse at prescribed times corresponding to a prescribed condition of said offset detector means.

8. Offset stacking apparatus for diverting punched cards from their motion along a prescribed path from either of a Normal ejection position or an Offset ejection position along said path into engagement with stacking means for Normal or Offset stacking thereby, respectively, said apparatus comprising in combination:

control means including a pair of presence detector means each arranged to develop Normal and Offset signals respectively, each of said detector means being spaced a prescribed common distance from said Normal and Offset ejection positions respectively; circuit means for selectively applying one of said signals to initiate ejection of a card at a time which corresponds to ejection from a selected one of said positions, said logic means including pulse generating means; first gating means connected between one of said detector means and said pulse generating means; second gating means connected to the outputs of said detector means and to a Reject signal means; disabling means arranged at the output of said second gating means to disable said first gating means in response thereto and third gating means arranged between said detectors and said disabling means to reset the condition of said disabling means and thereby enable said first gating means;

solenoid ejector means disposed to thrust cards edgewise from either of said positions, being connected to the output of said pulse generating means and being adapted to so thrust a card responsive to prescribed signals from said generating means;

smooth, flat platform means disposed along said path adjacent said ejector means so as to support cards in alignment for engagement with said stacking means; and continuously moving belt drive means adapted to yieldingly urge said cards against said platform means so a portion thereof protrudes towards said ejector means for engagement thereby edgewise, on the fly, while sliding them thereacross at a prescribed speed.

9. A method of transporting computer unit records along a prescribed path from an input station to an output station, said output station being disposed adjacent said path and aligned to accept said records along a direction relatively transverse to said path, said method comprising the steps of:

advancing said records from said input station along a prescribed reference area, at a prescribed constant speed and so as to be resiliently engaged with portions of said records projecting from said area;

detecting the passage of record edges along said path by first and second detector means and selectively applying output pulses from said detector means to ejector means to initiate the thrust thereof against the edges of said projecting portions of said records as they are advanced along said area diverting them transverse of said path on-the-fly for prescribed, variable alignment at said output station.

10. In a unit record transport combination, means for moving a record along a predetermined path with a prescribed speed; diverting means for selectively applying an impulse to said moving record in a direction angularly disposed to said path so as to divert said record on-the-fiy without substantially affecting said speed; and receiving means for receiving said moving record diverted from its path by said impulse.

11. The combination recited in claim 10 and further including control means for selectively varying the time for applying said impulse to said record to control the position of said record in said receiving means.

12. In a unit-record handling apparatus including record transport means, the combination therewith comprising:

record diverter means adapted to selectably thrust records proceeding along a first direction into a second transport direction edgewise and on-the-fly without deceleration thereof; and record detection means adapted to initiate said diverter means at times corresponding to prescribed different thrust paths along said second direction.

13. In a document handling system adapted to present documents successively at an input station and remove them from an output station with output means along at least one output path, an improved intermediate transport arrangement comprising:

transport means adapted to engage said documents at said input station and translate them along a prescribed translation path at computer record handling speeds to a diversion position associated with a respective output path, said transport means being adapted to present a prescribed edge portion of said documents along a prescribed locus in prescribed alignment with said output means; thrust means disposed operatively adjacent said locus and adapted to be selectively energized to thrust said edge portion therefrom, edgewise and angularly with respect to said translation path, to be thus diverted into prescribed aligned engagement with said output means; and signalling means adapted to indicate when each said document will arrive at a prescribed diversion position associated with a selected one of said output paths, and to responsively initiate such energization of said thrust means for controlling said diversion, said thrust means being adapted to effect said diversion of itself, without separate stop means or the like.

14. In a document-handling system adapted to present documents successively along an input path at computer record handling speeds, the combination therewith of an improved cornering assembly disposed in combination therewith along said input path, said cornering assembly being adapted to divert said documents from said path along prescribed output paths controllably, without impacting them against separate stop means or the like, said assembly comprising:

diverter means adapted to selectively engage said documents at prescribed selectable times during their travel along said input path, each time corresponding to a prescribed diversion position along an associated one of said output paths; and control means operatively coupled with said diverter means and including document passage detect means disposed along said input path in preschibed positional relation with said positions; and also including control circuit means coupling said detect means for energization of said diverter means at selected ones of said times.

References Cited by the Examiner

UNITED STATES PATENTS

| | | | |
|---|---|---|---|
| 2,995,242 | 8/1961 | Bramscomb | 209—110 |
| 3,024,904 | 3/1962 | Gray et al. | 209—110 X |
| 3,137,499 | 6/1964 | Maidment | 271—71 |
| 3,223,409 | 12/1965 | Eissfeld et al. | 271—71 |
| 3,241,664 | 3/1966 | Maul | 209—74 |

EVON C. BLUNK, *Primary Examiner.*

A. C. HODGSON, *Assistant Examiner.*